(12) United States Patent
Melbinger

(10) Patent No.: US 7,658,007 B2
(45) Date of Patent: Feb. 9, 2010

(54) METHOD FOR MAKING WHEEL RIM

(76) Inventor: Donald Melbinger, 16918 Gridley Pl., Cerritos, CA (US) 90703

( * ) Notice: Subject to any disclaimer, the term of this patent is extended or adjusted under 35 U.S.C. 154(b) by 1197 days.

(21) Appl. No.: 10/792,962

(22) Filed: Mar. 3, 2004

(65) Prior Publication Data
US 2005/0209862 A1 Sep. 22, 2005

(51) Int. Cl.
*B21D 53/26* (2006.01)
*B23P 17/00* (2006.01)

(52) U.S. Cl. ............. 29/894.35; 29/894.3; 29/894.323; 29/894.324; 29/894.325; 29/894.354

(58) Field of Classification Search ............... 29/894.3, 29/894.323–894.325, 894.354, 894.35
See application file for complete search history.

(56) References Cited

U.S. PATENT DOCUMENTS

| | | | |
|---|---|---|---|
| D29,991 S | 1/1899 | Welch ...................... D12/208 |
| 1,718,874 A | 6/1929 | Paull ...................... 301/95.105 |
| 1,809,605 A | 6/1931 | Sauzedde ............... 29/894.354 |
| 2,028,536 A | 1/1936 | Eksergian ............. 301/95.106 |
| 2,029,132 A | 1/1936 | Skelton ................... 301/5.1 |
| 2,057,565 A | 10/1936 | Eksergian ................. 301/5.1 |
| 2,083,327 A | 6/1937 | Eksergian ................. 301/5.1 |
| 2,126,223 A | 8/1938 | Schwinn ............... 301/95.106 |
| 2,143,950 A | 1/1939 | Kliesrath ............... 188/264 W |
| 2,155,667 A | 4/1939 | Jeune ...................... 301/6.6 |
| 3,228,097 A | 1/1966 | Tucker .................. 29/894.354 |
| D216,785 S | 3/1970 | Hata ........................ D12/208 |
| 3,784,260 A | 1/1974 | Araya ................... 301/95.105 |
| 3,822,458 A * | 7/1974 | Schulte et al. ......... 29/894.324 |
| 4,054,168 A | 10/1977 | Beers et al. .................. 152/520 |
| 4,127,020 A | 11/1978 | Bosch ........................... 72/68 |
| 4,185,370 A | 1/1980 | Evans .................... 29/894.354 |
| 4,286,825 A | 9/1981 | Sieving ................. 301/95.105 |
| 4,462,447 A | 7/1984 | Siefert et al. ................. 152/454 |
| 4,606,206 A * | 8/1986 | Daudi ........................... 72/68 |
| 4,624,038 A | 11/1986 | Walther ................. 29/894.324 |
| 4,936,129 A * | 6/1990 | Lipper et al. .................. 72/68 |
| 5,257,455 A * | 11/1993 | Iwatsuki ................. 29/894.323 |
| 5,292,182 A | 3/1994 | Kanazawa et al. ............. 301/65 |
| 5,380,071 A | 1/1995 | Kier, Jr. .................. 301/63.101 |
| 5,433,511 A | 7/1995 | Wei .............................. 301/65 |
| 5,446,962 A | 9/1995 | Matossia et al. ........ 29/894.324 |
| 5,526,977 A | 6/1996 | Wei ............................. 228/208 |
| 5,533,260 A | 7/1996 | Kier, Jr. ................. 29/894.322 |
| 5,533,261 A | 7/1996 | Kemmerer ............. 29/894.322 |
| D389,446 S | 1/1998 | Bradley ..................... D12/208 |
| 5,740,609 A * | 4/1998 | Jurus ..................... 29/894.324 |
| 5,794,340 A * | 8/1998 | Pollkotter .............. 29/894.324 |
| 5,845,400 A | 12/1998 | Takamoku ............. 29/894.354 |
| 5,927,167 A | 7/1999 | Naumann et al. ............ 82/1.11 |
| 6,450,583 B2 * | 9/2002 | Hale et al. ............. 301/63.101 |
| 7,363,709 B2 * | 4/2008 | Tanaka .................. 29/894.353 |

* cited by examiner

*Primary Examiner*—David P Bryant
*Assistant Examiner*—Alexander P Taousakis
(74) *Attorney, Agent, or Firm*—Cislo & Thomas, LLP; Kelly W. Cunningham

(57) ABSTRACT

Methods for forming a soft lip for a wheel rim are disclosed herein. The wheel rim may be a cold-formed, spun-formed, or rolled-formed cylindrical blank, wherein the blank includes an upturned outer edge. As the blank is spun, a blunting roller lowered to contact the upturned outer edge to blunt the outer edge into a work-strengthened annular bead, and finish off the external surface of the annular bead to form a soft lip.

17 Claims, 2 Drawing Sheets

METHOD FOR MAKING WHEEL RIM

BACKGROUND

Various wheel rims have been developed in the art for racing purposes, aesthetics, or the like. Generally, these rims are made from aluminum and may be formed by casting, forging, or other methods known or developed in the art. These rims are desirable because they are generally lightweight yet strong and may be readily customized (e.g., design, wheel size, and wheel offset). However, these rims are generally expensive to manufacture. Thus, while prior art methods of making wheel rims have been useful, there remains a need for a cost-effective means for producing wheel rims.

SUMMARY

According to one method, a soft lip for a wheel rim is formed by providing a wheel rim having an upturned outer edge and a blunting roller. The wheel rim is spun and the blunting roller contacts the upturned outer edge to form a blunted outer edge. The blunted outer edge is then finished.

In another method, a blunted edge for a wheel rim is formed by providing a wheel rim having an upturned outer edge directed away from the major axis of rotation for the rim. The wheel rim is spun and a blunting roller contacts the upturned outer edge to form a blunted outer edge and a guiding edge. The blunted outer edge is then finished removing the guiding edge.

In yet another method, a soft lip wheel rim is formed by cold-forming a cylindrical wheel blank. A radially extending flange is formed on one end of the cylindrical wheel blank. The cylindrical wheel blank is spun, and a blunting roller contacts the radially extending flange to form a soft lip.

DETAILED DESCRIPTION

The detailed description set forth below in connection with the appended drawings is intended as a description of embodiments and is not intended to represent the only forms in which the embodiments may be constructed and/or utilized. The description sets forth the functions and the sequence of steps for constructing and operating these embodiments. However, it is to be understood that the same or equivalent functions and sequences may be accomplished by different embodiments that are also intended to be encompassed within the spirit and scope of the embodiment disclosed herein.

Figure 1:
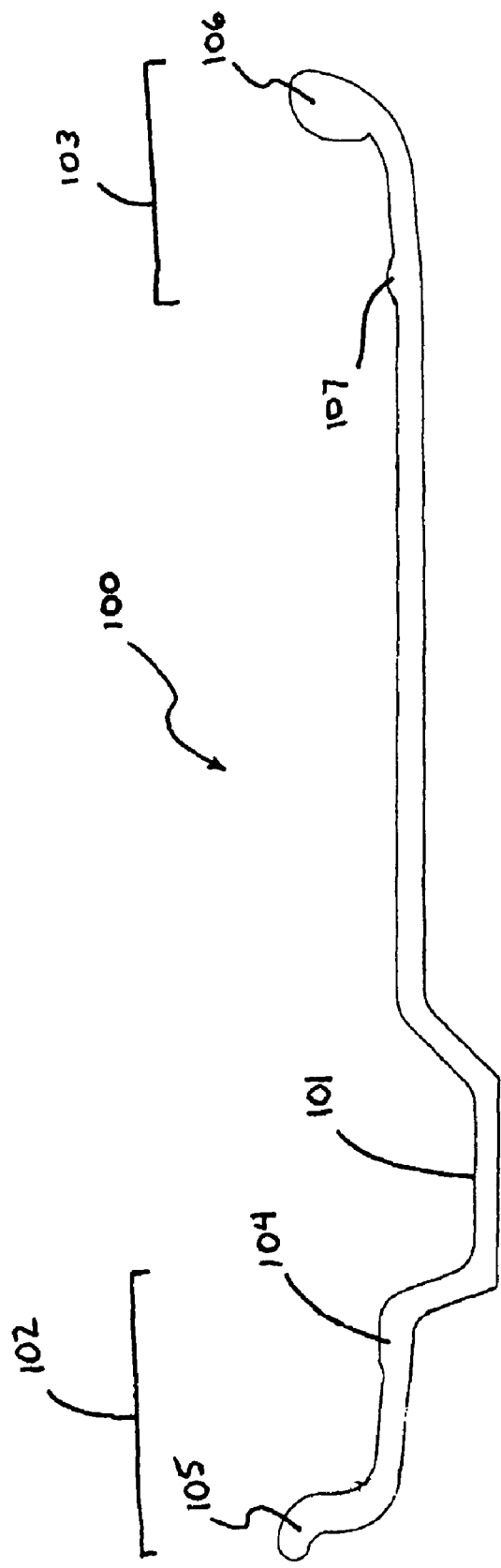
FIG. 1 is a cross-sectional view of an embodiment of a wheel rim made in accordance with a method disclosed herein.

FIG. 1 illustrates a cross-sectional view of one embodiment of a cold formed alloy wheel 100. In another embodiment, the alloy wheel 100 may be a spun rim. In yet another embodiment, the alloy wheel 100 may be a rolled-formed rim. The rim 100 includes an inwardly depressed drop well 101 and an inner bead seat 102 and an outer bead seat 103. The inner bed seat 102 and outer bead seat 103 are the locations in which a tire's beads (not shown) contact to the wheel rim 100. The inner bead seat 102 is comprised of an annular shoulder 104 and an inboard flange 105 spaced away from the annular shoulder 104. The outer bead seat 103 is comprised of an outer flange 106 and an annular shoulder 107.

As those skilled in the art will appreciate, the external surface of the outer flange 106 is also referred to as a soft lip. The outer flange 106 has a thickness that is greater than the other portions of the rim. The thicker outer flange provides strength for the outer flange while providing the aesthetics of a soft lip. As shown in FIG. 1, the outer flange 106 is generally curved and has a teardrop-like cross-section. As these skilled in the art will appreciate, the outer flange may have a plurality of other desired shapes.

Figure 2:
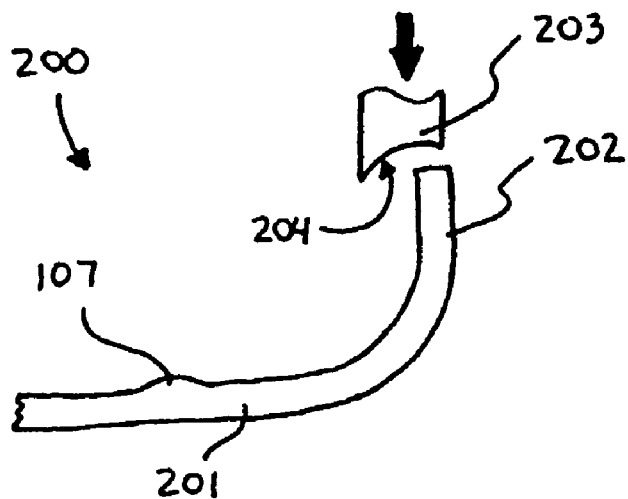
FIG. 2 is an enlarged cross-sectional view of a portion of an embodiment of a wheel rim prior to contact with a blunting roller.

The various embodiments of the alloy wheel rim may be formed by various methods known or developed in the art. For instance, the rim may be formed by the method disclosed in U.S. Pat. Nos. 5,446,962 and 6,450,583. Aluminum or other metal may be used to form a cylindrical blank 200. The cylindrical blank 200 has a cross-sectional view similar to that of FIG. 1 with the exception of the outer edge 201 of the blank 200. As shown in FIG. 2, the outer edge 201 includes an upturned or radially extending flange portion 202 that extends in a direction perpendicular or substantially perpendicular away from major axis of rotation of the blank and has a substantially uniform thickness defined by an internal surface 302, an upper surface 303, and an external surface 304.

The cylindrical blank 200 is then inserted into a spinning machine (not shown) such that the cylindrical blank 200 is spun about its axis. Additionally, FIG. 2 shows a blunting roller 203 positioned above the outer edge 201 of the cylindrical blank 200. According to one embodiment, the blunting roller 203 has a concave face 204. In other embodiments, the face of the blunting roller 203 that contacts the cylindrical blank 200 may have a plurality of shapes such as, but not limited to, a convex face, a substantially flat face, an angled face, or the like.

According to one method, as a cylindrical blank 200 is spun, the radial extending flange 202 may be pre-machined. In one method, the pre-machining process includes truing of the radially extending flange 202 such that the upper surface 303 of the radial extending flange is substantially circular. In another method, the pre-machining process may also include beveling the inner surface 302 of the radially extending flange 202. The beveling process may include removing a portion of an inner corner and a portion of the inner wall of the radially extending flange 202. As a result, the radially extending flange 202 is tapered (i.e., the width of the distal portion of the radially extending flange 202 is less than the width of the proximal portion of the radially extending flange 202). Once the flange 202 is pre-machined, the flange 202 may be blunted by one or more of the methods disclosed herein. Alternatively, this beveling or tapering can be accomplished by pre-machining the external surface 304 of the upturned or radially extending flange 202.

Figure 3:
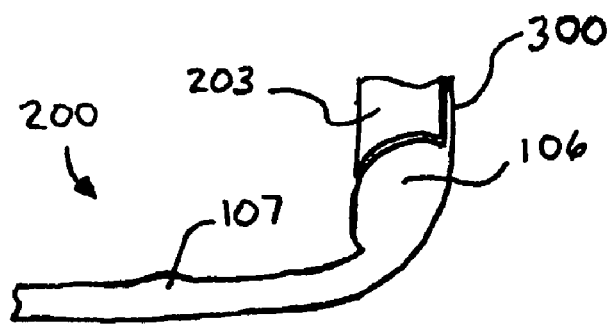
FIG. 3 is an enlarged cross-sectional view of a portion of the embodiment of FIG. 2 contacting a blunting roller.
Figure 4:
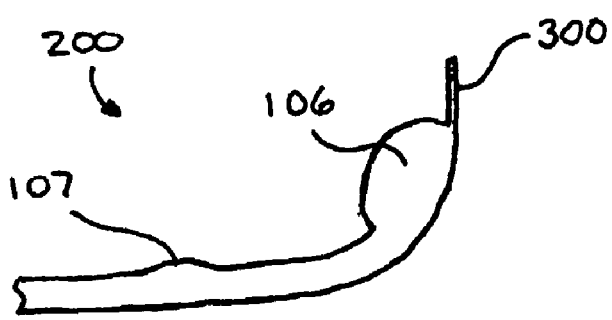
FIG. 4 is an enlarged cross-sectional view of a portion of the embodiment of FIG. 3 after contacting the blunting roller.
Figure 5:
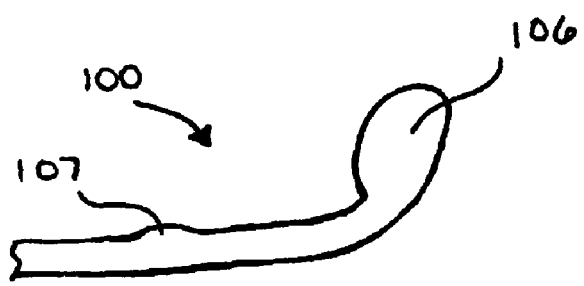
FIG. 5 is an enlarged cross-sectional view of a portion of the embodiment of FIG. 4 after finishing.

In one method, as the cylindrical blank 200 is spun, the blunting roller 203 is then lowered to contact the radially extending flange 202. According to another method, the blunting roller 203 is lowered to contact and deform the flange 202 such that a guiding flange portion 300 is formed as shown in FIG. 3. That is, the blunting roller 203 is slightly offset so that a portion of the flange 202 does not contact the face 204 of the blunting roller 203. As the blunting roller 203 is further lowered onto the flange 202, the guiding flange portion 300 is formed. It is found that the guiding flange portion 300 formed in this way can assist in maintain a proper positioning of the blunting roller 203 as it continues to travel downward deforming the flange 202. In an alternate method, the blunting roller 203 is positioned over the flange 202 such that a all or substantially all of the upper surface 303 of the flange 202 is deformed thereby and as guiding flange portion 300 is not formed.

As the blunting roller 203 contacts the flange 202, the shape of the flange is altered to form a blunted outer edge or soft lip 106. Additionally, the thickness of the flange 202 increases as the blunting roller 203 changes the configuration of the flange 202 into a soft lip 106 as shown in FIG. 1. The increased thickness of the flange 202 and the work-hardening effect of the blunting roller on the blunted region increase the strength of the flange. Furthermore, the process of contacting the flange 202 with a blunting roller 203 creates a highly rigid and strong final annular bead or soft lip flange 106 because this process avoid bending, folding, rolling, or otherwise manipulated in a manner that would create any local tensile forces in the alloy in order to form a final flange or soft lip. Instead, the soft lip 106 of the present invention is formed by the compressive force of the blunting roller 203. As those skilled in the art will appreciate, the distance the blunting roller 203 moves while contacting the flange 202 may be varied depending upon the desired shaped and size of the completed soft lip 106.

Once the flange 202 is sufficiently blunted to form the desired shape and size of the soft lip 106 of the wheel rim, the flange 202 may be finished. According to one method, the finishing process includes the removal of the guiding flange 300. The finishing process may also include further machining or polishing of the soft lip 106.

In closing, it is to be understood that the embodiments described herein are illustrative of the principles of the present invention. Other modifications that may be employed are within the scope of the invention. Thus, by way of example, but not of limitation, alternative configurations may be utilized in accordance with the teachings herein. Accordingly, the drawings and description are illustrative and not meant to be a limitation thereof.

What is claimed is:

1. A method for forming a smooth blunted outer edge of a wheel rim comprising:
   providing a wheel rim having an upturned outer edge comprising an internal surface, an upper surface, and an external surface;
   providing a blunting roller comprising a concave surface;
   spinning the wheel rim;
   contacting the blunting roller to the upturned outer edge to form both a blunted outer edge and a guiding edge extending outward away from said blunted outer edge; and
   finishing the blunted outer edge to form a smooth outer edge.

2. The method of claim 1 further comprising pre-machining the upturned outer edge prior to contacting the blunting roller to the upturned outer edge.

3. The method of claim 2 wherein the pre-machining comprises truing up the upper surface of the upturned outer edge.

4. The method of claim 2 wherein the pre-machining comprises beveling the internal surface of the upturned outer edge.

5. The method of claim 1 wherein finishing the blunted outer edge comprises removing the guiding edge.

6. The method of claim 5 wherein finishing the blunted outer edge further comprises polishing the blunted outer edge.

7. A method for forming a smooth lip outer edge of a wheel rim comprising:
   providing a wheel rim having an upturned outer edge comprising an internal surface, upper surface, and an external surface, wherein the upturned outer edge is substantially perpendicular to a major axis of rotation for the rim;
   spinning the wheel rim;
   contacting a blunting roller comprising a concave surface to the upturned outer edge to form both a blunted portion and a guiding edge extending outward away from said blunted portion; and
   finishing the blunted portion to form a smooth lip outer edge.

8. The method of claim 7 wherein finishing the blunted portion comprises removing the guiding edge.

9. The method of claim 8 wherein finishing the blunted outer edge further comprises polishing the external surface of the blunted portion.

10. A method for forming a smooth lip outer edge of a wheel rim comprising:
    providing a wheel rim having an upturned outer edge comprising an internal surface, upper surface, and an external surface, wherein the upturned outer edge is substantially perpendicular to a major axis of rotation for the rim;
    spinning the wheel rim;
    contacting a blunting roller to the upturned outer edge to form both a blunted portion and a guiding edge extending outward away from said blunted portion;
    pre-machining the upturned outer edge prior to contacting the blunting roller to the upturned outer edge; and
    finishing the blunted portion to form a smooth lip outer edge,
    wherein the pre-machining comprises truing up said upturned outer edge so that its upper surface forms a cylinder.

11. The method of claim 10 wherein the pre-machining comprises beveling the internal or external surface of the upturned outer edge.

12. The method of claim 10 wherein finishing the blunted portion comprises removing the guiding edge.

13. The method of claim 12 wherein finishing the blunted outer edge further comprises polishing the external surface of the blunted portion.

14. A method for making a smooth lip wheel rim, comprising:
    forming a cylindrical wheel blank having a first end and a second end;
    forming a radially extending flange on the first end of the cylindrical wheel blank;
    spinning the cylindrical wheel blank;
    truing the radially extending flange by pre-machining its upper edge surface so that its upper edge surface forms a cylinder
    applying a blunting roller to the radially extending flange to form a blunted annular bead;
    removing a portion of the radially extending flange to create a beveled surface on the flange; and
    finishing an outer surface of said blunted annular bead to form a smooth lip.

15. The method of claim 14 further comprising forming a guiding flange portion when applying the blunting roller to the radially extending flange.

16. The method of claim 15 wherein finishing the smooth lip further comprises removing the guiding flange portion.

17. The method of claim 16 further comprising polishing an external surface of the radially extending flange to form a smooth lip.

* * * * *